UNITED STATES PATENT OFFICE.

MORITZ ULRICH AND JOHANN BAMMANN, OF ELBERFELD, GERMANY, ASSIGNORS TO THE FARBENFABRIKEN, VORMALS FR. BAYER & CO., OF SAME PLACE.

BLUE DYE AND PROCESS OF MAKING SAME.

SPECIFICATION forming part of Letters Patent No. 544,700, dated August 20, 1895.

Application filed December 18, 1891. Serial No. 415,516. (Specimens.) Patented in England August 26, 1890, No. 13,443; in Austria-Hungary November 28, 1890, No. 35,494 and No. 58,417; in France December 6, 1890, No. 210,033, and in Italy April 27, 1891, XXV, 29,631, LVIII, 100.

*To all whom it may concern:*

Be it known that we, MORITZ ULRICH and JOHANN BAMMANN, doctors of philosophy, chemists, subjects of the Emperor of Germany, residing at Elberfeld, Germany, (assignors to the FARBENFABRIKEN, VORMALS FR. BAYER & CO., of Elberfeld,) have invented a new and useful Improvement in the Manufacture of Direct-Dyeing Coloring-Matters, (for which the aforesaid FARBENFABRIKEN have already obtained Letters Patent in the following countries: England, No. 13,443, dated August 26, 1890; France, No. 210,033, dated December 6, 1890; Austria-Hungary, No. 35,494 and No. 58,417, dated November 28, 1890, and Italy, XXV, No. 29,631, and LVIII, No. 100, dated April 27, 1891,) of which the following is a specification.

Our invention relates to the production of a new coloring-matter suitable for dyeing by the combination of one molecular proportion of tetrazoditolyl chloride with two molecular proportions of the sodium salt of the amidonaphtholdisulpho acid, which is obtained by melting with alkalies the naphthylamine trisulpho acid resulting when the naphthalene trisulpho acid of the German Patent No. 38,281, dated September 2, 1885, is nitrated and the formed nitronaphthalene trisulpho acid is reduced and which is a beta-disulpho acid of 1.8 amidonaphthol.

In carrying out our process practically we proceed as follows: 21.2 kilos, by weight, of tolidine or the equivalent quantity of its sulphate are diazotized in the usual manner by fourteen kilos of sodium nitrite, and the thus formed solution of tetrazoditolyl chloride is added in small portions to the watery solution of 72.6 kilos, by weight, of amidonaphthol-disulphonic sodium containing a large excess of sodium carbonate, taking care, by cooling, that the temperature does not rise above 10° centigrade.

The formation of the dye-stuff is finished after about forty-eight hours. The latter separates for most part, and the rest which has remained in solution is precipitated by adding common salt. By filtering off and drying the coloring-matter is isolated in the common manner.

Our new dye-stuff corresponds, according to its production, to the formula:

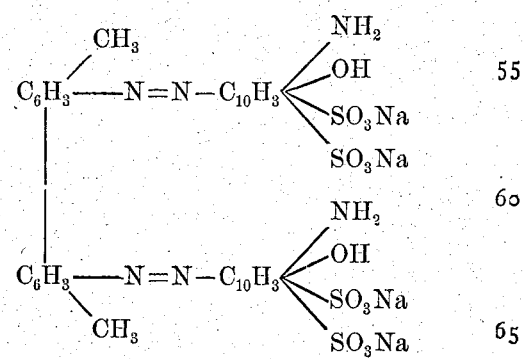

and when in a dry state and finely powdered is a bluish-gray powder, which easily dissolves in water with blue color, in sodium carbonate and ammonia liquid with the same color, and in soda-lye with reddish-blue color. It separates out of its watery or alkaline solutions on the addition of common salt as a dark-blue flaky precipitate. Its solutions, when mixed with strong mineral acids, do not change their color and a precipitate is not separated. In concentrated sulphuric acid it dissolves with a greenish-blue color, and when water is added slowly to the sulphuric acid solution a finely-powdered blue precipitate is separated, which is dissolved by a large excess of water with the same color. It dyes unmordanted cotton in soap baths a blue with a slight greenish hue and its shades are fast to alkali.

From the analogous benzidine derivative which is claimed separately in Serial No. 415,515 and which is obtained when one molecule of tetrazodiphenyl chloride is combined with two molecular proportions of the 1.8 amidonaphthol-beta-disulpho acid our new dye-stuff differs chiefly by its composition, as it contains two carbon and four hydrogen atoms more than the analogous benzidine product and by producing on cotton in soap baths shades which possess a greenish tinge, while those of the benzidine derivative show a reddish hue.

Having now particularly described our invention and in what manner it can be performed, that which we claim as new, and desire to secure by Letters Patent, is—

1. The manufacture of a direct dyeing coloring matter which consists in combining one molecular proportion of tetrazoditolyl chloride with two molecular proportions of the 1.8-amidonaphthol-beta-disulpho acid which is obtained by melting with alkalies at a temperature from about 200° to 210° centigrade the alpha naphthylamine trisulpho acid as hereinbefore described.

2. The new dye, having the formula described, which when dry and finely powdered forms a bluish-gray powder which easily dissolves in water with a blue color, in sodium carbonate and ammonia liquid with the same color, in soda lye with a reddish blue color from which solutions it is separated by common salt as a dark blue flaky precipitate, its watery solutions mixed with strong mineral acids do not change their color and a precipitate is not separated therefrom, it is dissolved by concentrated sulphuric acid with a blue color and by the addition of water to this solution a finely powdered blue precipitate is separated which is dissolved by an excess of water with the same color, and which dyes unmordanted cotton in soap baths a blue with a slight greenish hue, and its shades are fast to alkali.

In testimony whereof we have signed our names in the presence of two subscribing witnesses.

MORITZ ULRICH.
JOHANN BAMMANN.

Witnesses:
WM. ESSENWEIN,
RUDOLPH FRICKÉ.